US009490927B2

(12) United States Patent
Cugini et al.

(10) Patent No.: US 9,490,927 B2
(45) Date of Patent: Nov. 8, 2016

(54) CHANGING THE SPECTRAL POSITION OF A LIGHTPATH

(75) Inventors: Filippo Cugini, Fidenza (IT); Giulio Bottari, Leghorn (IT); Gianmarco Bruno, Genoa (IT); Piero Castoldi, Vicopisano (IT); Paola Iovanna, Rome (IT); Nicola Sambo, Leghorn (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 246 days.

(21) Appl. No.: 14/382,299

(22) PCT Filed: Mar. 22, 2012

(86) PCT No.: PCT/EP2012/055153
§ 371 (c)(1),
(2), (4) Date: May 10, 2015

(87) PCT Pub. No.: WO2013/127472
PCT Pub. Date: Sep. 6, 2013

(65) Prior Publication Data
US 2015/0244493 A1 Aug. 27, 2015

(30) Foreign Application Priority Data
Mar. 1, 2012 (EP) .................................... 12157718

(51) Int. Cl.
*H04J 14/02* (2006.01)

(52) U.S. Cl.
CPC ........ *H04J 14/0227* (2013.01); *H04J 14/0254* (2013.01); *H04J 14/0257* (2013.01); *H04J 14/0267* (2013.01); *H04J 14/02* (2013.01); *H04J 14/026* (2013.01); *H04J 14/0224* (2013.01)

(58) Field of Classification Search
CPC ............. H04J 14/0227; H04J 14/0254; H04J 14/0257; H04J 14/02; H04J 14/0267; H04J 14/0224; H04J 14/026
USPC .......................................................... 398/79
See application file for complete search history.

(56) References Cited

U.S. PATENT DOCUMENTS

| 5,949,562 A * | 9/1999 | Kubota | ............... H04J 14/0224 398/79 |
| 6,859,443 B1 * | 2/2005 | Mushkin | ............. H04B 7/2621 370/324 |

(Continued)

FOREIGN PATENT DOCUMENTS

| JP | 08139697 A | 5/1996 |
| JP | 08279802 A | 10/1996 |
| JP | 09321711 A | 12/1997 |

OTHER PUBLICATIONS

Japanese Office Action issued Nov. 10, 2015 in connection with Japanese Application No. 2014-559110, 4 pages.

(Continued)

*Primary Examiner* — Dalzid Singh
(74) *Attorney, Agent, or Firm* — Leffler Intellectual Property Law, PLLC

(57) ABSTRACT

A method of changing the spectral position of a lightpath between a source node and a destination node of an optical network. The optical network uses a flexible grid for spectral allocation and the lightpath has been allocated first spectral resources at a first spectral position. The method comprises, at the source node, reserving additional spectral resources for the lightpath which are contiguous in frequency with the first spectral resources. The method comprises re-tuning a light source at the source node such that the lightpath moves in frequency from using the first spectral resources at the first spectral position to using second spectral resources at a second spectral position, wherein the second spectral resources comprise at least some of the additional spectral resources. The method comprises releasing at least some of the first spectral resources. The source node continues to send traffic over the lightpath during the re-tuning.

19 Claims, 10 Drawing Sheets

(56) References Cited

U.S. PATENT DOCUMENTS

| | | | | |
|---|---|---|---|---|
| 6,859,623 | B2* | 2/2005 | Le Bouette | H04B 10/296 398/164 |
| 8,781,328 | B2* | 7/2014 | Patel | H04J 14/0267 398/47 |
| 2011/0222862 | A1* | 9/2011 | Boertjes | H04J 14/0212 398/116 |
| 2012/0269506 | A1* | 10/2012 | Vassilieva | H04J 14/0221 398/26 |

OTHER PUBLICATIONS

English language translation of Japanese Office Action issued Nov. 10, 2015 in connection with Japanese Application No. 2014-559110, 3 pages.

PCT International Search Report, mailed Nov. 20, 2012, in connection with International Application No. PCT/EP2012/055153.

Gerstel, Ori "Flexible use of Spectrum and Photonic Grooming" Jul. 25, 2010, XP55024977, Retrieved from the Internet: URL:http://www.opticsinfobase.org/DirectPDFAccess/E282BC0D-E781-F51F-11F367CC61A1278C__204773.pdf?da=1&id=204773&uri=PS-2012-PMD3&seq=0&mobile=no.

Gerstel, Ori et al. "Elastic optical networking: a new dawn for the optical layer?" IEEE Communications Magazine, IEEE Service Center, Piscataway, US, vol. 50, No. 2, Feb. 1, 2012, pp. S12-s20, XP011417038, ISSN: 0163-6804.

Masahiko, J. et al "Elastic and adaptive optical networks: possible adoption scenarios and future standardization aspects" IEEE Communications Magazine, IEEE Service Center, Piscataway, US, vol. 49, No. 10, Oct. 1, 2011, pp. 164-172, XP011385330, ISSN: 0163-6804.

Colavolpe, G. et al. "Robust multilevel coherent optical systems with linear processing at the receiver" Journal of Lightwave Technology, vol. 27, No. 13, Jul. 2009, pp. 2357-2369, XP002686337.

Awduche, D. et al. "RSVP-TE: Extensions to RSVP for LSP Tunnels" RFC 3209, pp. 1-61, Network Working Group, Dec. 2001.

Berger, L. et al. "GMPLS Segment Recovery" RFC 4873, pp. 1-25, Network Working Group, May 2007.

Lang, J. P. et al. "RSVP-TE Extensions in Support of End-to-End Generalized Multi-Protocol Label Switching (GMPLS) Recovery" RFC 4872, pp. 1-47, Network Working Group, May 2007.

* cited by examiner

CHANGING THE SPECTRAL POSITION OF A LIGHTPATH

CROSS-REFERENCE TO RELATED APPLICATIONS

This application claims priority under 35 U.S.C. §119 to European Patent Application No. 12157718.3, filed Mar. 1, 2012, which is hereby incorporated herein by reference in its entirety.

TECHNICAL FIELD

This invention relates to a method of changing the spectral position of a lightpath in an optical network and to apparatus for implementing the method. This can be used, for example, to defragment spectral resources in the optical network.

BACKGROUND

Optical communication networks use wavelength division multiplexed (WDM) techniques to carry multiple traffic flows. Each lightpath uses a different wavelength channel within a defined spectral band. Conventionally, optical networks have used a fixed grid of WDM or densely wavelength division multiplexed (DWDM) optical channels for lightpaths. An optical source, optical receiver and multiplexing components along an optical path are all based on this grid of wavelength values. The International Telecommunications Union (ITU-T) has defined a grid of channels, typically with 50 GHz or 100 GHz spacing.

There are now plans to provide a more flexible grid of spectral resources, called a flexi-grid. One reason for considering a flexible grid is to accommodate the spectral needs of higher bit rate channels, such as 400 Gbit/s or 1 Tbit/s channels. The flexible grid allows a more flexible use of the limited spectral resources. A lightpath can be allocated a channel bandwidth which is suited to the transmission needs of the lightpath (e.g. a small number of spectral blocks, or a larger number of spectral blocks), and the spacing between adjacent blocks of allocated spectrum can be adjusted to match the needs of the particular transmission scheme. This can allow better use of the limited spectral resources on transmission links of the optical network.

In optical networks, it is advantageous to have the spectral resources that are available for use (free resources) located together in one or more large blocks. However, the free resources are often fragmented. That is, the free resources are located in multiple discontinuous regions of the spectrum of a link. Also, the free resources can be located in different places on different links. Fragmentation of the spectral resources can arise due to dynamic traffic conditions, unexpected network evolutions and network recovery and maintenance operations. Fragmentation can also arise due to the process of allocating a single wavelength, where possible, for an end-to-end path between a source node and a destination node. In an optical network with a flexible grid, the presence of lightpaths possibly operating at different bit rates and modulation formats and occupying a variable portion of the frequency spectrum, can further increase the problem of fragmentation of spectral resources.

The process of forming larger, contiguous, blocks of free resources is called defragmentation. Effective defragmentation techniques, also called optimisation techniques, are useful to improve the overall spectrum utilisation in flexible optical networks.

A simple example of fragmentation of spectral resources is shown in FIG. 1A. FIG. 1A shows a portion of a network comprising four nodes 10, A-D, and three links 11. There is a first lightpath 12 between nodes A and B, and a second lightpath 13 between nodes B and D. FIG. 1A also shows the spectral resources that have been allocated to the lightpaths 12, 13. The first lightpath 12 occupies k frequency slots (where k is any integer number≥1), and has f0 as the nominal central frequency. The second lightpath 13 between nodes B and D occupies k frequency slots on links B-C and C-D and has f1 as the nominal central frequency. Although there are unused frequency slots along the route A-D, they are located in different parts of the spectrum at different points along the route A-D. This scenario prevents the set up of a new lightpath from node A to node D, unless wavelength conversion is provided at node B. Wavelength conversion is undesirable as it requires additional opto-electro-opto transponders at a node.

FIG. 1B shows the same scenario after an optimisation of the spectral resources. In this case, lightpath B-D is moved from the spectral position shown in FIG. 1A (nominal centre frequency f1) to the spectral position shown in FIG. 1B (nominal centre frequency f0). Changing the spectral allocation of the lightpath 13 defragments the spectrum, enabling the set up of one or more lightpaths from A to D allocated in the released frequency slots.

A known process for defragmenting the spectrum is called Make-before-Break (MbB), which is described in Internet Engineering Task Force (IETF) document RFC 3209, "Extensions to RSVP for LSP Tunnels" at section 2.5 "Rerouting Traffic Engineered Tunnels". Make-before-break is also described in RFC 4872 and RFC 4873. The three main steps of Make-before-Break are shown in FIG. 1C. Step 0 shows the initial situation, before implementing the Make-before-Break process, with the lightpath 13 allocated a block 14 of frequency slots with the nominal centre frequency f1. In the first step an additional lightpath between the same source node (B) and destination node (D) pair is established along the newly computed route or central frequency. A new lightpath from node B to node D is set up in a different block 15 of spectral resources with f0 as the nominal central frequency. In the second step the client traffic is switched between the two active lightpaths. In the third step the original lightpath from B to D at the nominal central frequency f1 is torn down.

There are some disadvantages associated with performing Make-before-Break operations. Make-before-Break may introduce some traffic disruption or misordering. Packet duplication or loss can occur due to traffic switching between the two lightpaths at the source node or can arise due to delay variations caused by different latencies (e.g. if different routes are considered). This can cause disruption at the service level. Make-before-Break also requires the availability of additional spare and expensive transponders at both the source node and the destination node. A further issue affecting Make-before-Break relates to the additional operations needed at the optical layer. The set up operation at step 1 of FIG. 1C and the teardown operation at step 3 of FIG. 1C varies the number of active lightpaths along the traversed links, which can have an effect on optical amplifiers traversed by those lightpaths. This can require optical power equalisation procedures, and can possibly affect the stability of other active lightpaths.

The present invention seeks to provide an alternative way to change the allocation of spectral resources to a lightpath.

SUMMARY

An aspect of the invention provides a method of changing the spectral position of a lightpath between a source node and a destination node of an optical network. The optical network uses a flexible grid for spectral allocation. The lightpath has been allocated first spectral resources at a first spectral position. The method comprises, at the source node, reserving additional spectral resources for the lightpath which are contiguous in frequency with the first spectral resources. The method further comprises re-tuning a light source at the source node such that the lightpath moves in frequency from using the first spectral resources at the first spectral position to using second spectral resources at a second spectral position. The second spectral resources comprise at least some of the additional spectral resources. The method further comprises releasing at least some of the first spectral resources. The source node continues to send traffic over the lightpath during the re-tuning.

Another aspect of the invention provides a method of changing the spectral position of a lightpath between a source node and a destination node of an optical network. The optical network uses a flexible grid for spectral allocation. The lightpath has been allocated first spectral resources at a first spectral position. The method comprises, at the destination node, reserving additional spectral resources for the lightpath which are contiguous in frequency with the first spectral resources. The method further comprises releasing at least some of the first spectral resources after the lightpath has moved in frequency from using the first spectral resources at the first spectral position to using second spectral resources at a second spectral position. The second spectral resources comprise at least some of the additional spectral resources. The destination node continues to receive traffic over the lightpath during the change in the spectral position of the lightpath.

An advantage of an embodiment of the invention is that it is possible to defragment (optimise) the use of spectral resources on links of the flexible optical network. The method allows the lightpath to be moved to a new spectral position without traffic disruption and without requiring additional spare transponders or re-equalisation (e.g. power levelling) operations. There is no traffic disruption because no lightpath setup/teardown processes or switching operations on traffic tributaries are performed. There is no need for optical power re-equalisations because the number of active lightpaths per link (i.e. per traversed optical amplifier) remains constant.

A method according to an embodiment of the invention can be called a push-pull method, because the source node "pushes" the lightpath to a new spectral position by re-tuning of a transmission wavelength of the optical source (e.g. laser), and the wavelength at the destination node is "pulled" by following the change in wavelength of the source node.

The second spectral resources can be contiguous in frequency with the first spectral resources, or the second spectral resources can overlap in frequency with the first spectral resources. In other embodiments, the second spectral resources can be offset from the first spectral resources by intermediate spectral resources. Advantageously, the step of reserving additional spectral resources reserves the intermediate spectral resources and the step of releasing also releases the intermediate spectral resources. Advantageously, the method further comprises determining if the intermediate spectral resources are available.

Advantageously, there is a receiver at the destination node for receiving the lightpath and the step of re-tuning a source is performed at a rate which is within automatic frequency tuning capabilities of the receiver.

Advantageously, an amount of spectral resources allocated to the lightpath remains the same in the first spectral position and the second spectral position. However, in an embodiment it is possible to change the amount of resources.

The method can be implemented with control plane signalling, and/or with management plane signalling. Advantageously, the method can be implemented without any additional extensions to existing signalling formats. The technique is suitable for different bit-rates and modulation formats in flexible optical networks with path computation that is either centralised (e.g. by a Path Computation Entity, PCE) or distributed.

Another aspect of the invention provides a method of changing the spectral position of a lightpath between a source node and a destination node of an optical network, wherein the optical network uses a flexible grid for spectral allocation and the lightpath has been allocated first spectral resources at a first spectral position. The method comprises, at a network management system, causing the source node or the destination node to perform the method described above, or in the following pages.

The flexible optical network can be based on stand-alone optical cross-connects (e.g. Reconfigurable Optical Add-Drop Multiplexers, ROADM) operating on a flexible grid) or with optical components integrated in a packet opto device (POTP).

Another aspect of the invention provides apparatus for use at a node of an optical network which uses a flexible grid for spectral allocation. The apparatus comprises a transponder which is arranged to support a lightpath which is allocated first spectral resources at a first spectral position. The transponder comprises a light source. The apparatus further comprises a controller which is arranged to support a change in a spectral position of the lightpath by reserving additional spectral resources for the lightpath which are contiguous in frequency with the first spectral resources. The controller is arranged to re-tune the light source at the node such that the lightpath moves in frequency from using the first spectral resources at the first spectral position to using second spectral resources at a second spectral position, wherein the second spectral resources comprise at least some of the additional spectral resources. The controller is arranged to release at least some of the first spectral resources. The node is arranged to continue to send traffic over the lightpath during the change in the spectral position of the lightpath.

Another aspect of the invention provides apparatus for use at a node of an optical network which uses a flexible grid for spectral allocation. The apparatus comprises a transponder which is arranged to support a lightpath which is allocated first spectral resources at a first spectral position. The apparatus further comprises a controller which is arranged to support a change in a spectral position of the lightpath by reserving additional spectral resources for the lightpath which are contiguous in frequency with the first spectral resources. The controller is arranged to release at least some of the first spectral resources after the lightpath has moved in frequency from using the first spectral resources at the first spectral position to using second spectral resources at a second spectral position, wherein the second spectral resources comprise at least some of the additional spectral resources. The node is arranged to continue to receive traffic over the lightpath during the change in the spectral position of the lightpath.

Another aspect of the invention comprises a network management system for an optical network comprising a plurality of nodes which use a flexible grid for spectral allocation. The network management system comprises a controller. The network management system comprises a signalling interface for communicating with nodes of the network. The controller is arranged to send instructions to the nodes to perform the method described above, or in the following pages.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Referring again to FIG. 1A, this shows an optical transmission network 2 with nodes A-D. Optical transmission links 11 connect nodes 10. Traffic is carried on links 11 by wavelength channels, which are also called lambdas. At the source node and destination node of a lightpath there are optical transceivers for optically transmitting traffic on lambdas and for optically receiving traffic on lambdas. Advantageously, a node comprises an optical cross-connect which is arranged to forward traffic based on wavelength of the lambda.

Figure 2:
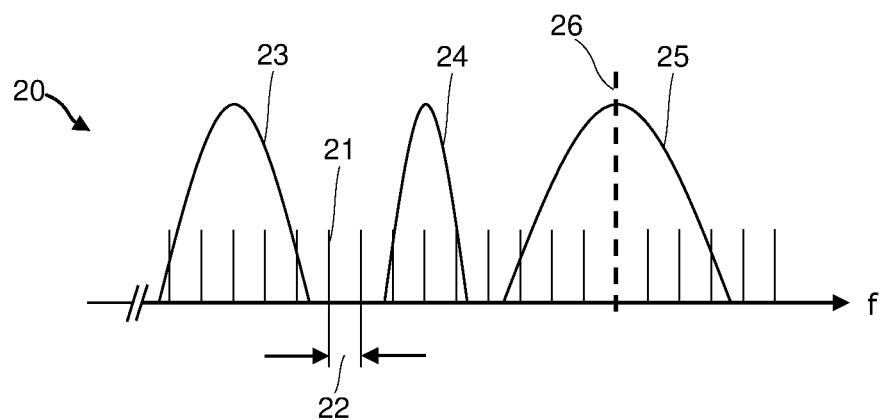
FIG. 2 shows a flexible grid allocation scheme.

The optical network 2 is a flexible optical network. A transponder at a source node is arranged to modulate an optical carrier signal with data using one of a range of possible modulation formats and a transponder at a destination node is arranged to demodulate a modulated optical carrier signal using a complementary demodulation technique. The transponders can operate at various bit rates. The operating wavelength of the transponder can be configured from a range of possible wavelengths. The network 2 supports optical channels of variable bandwidth. FIG. 2 shows a node 10 of the flexible optical network 2 in more detail.

The flexible optical network 2 uses a flexible grid of frequency resources, shown in FIG. 2. The frequency resources are allocated to lightpaths as required. One implementation of the flexible grid 20 uses a grid of frequency values 21 which are spaced apart 22 by a fixed value, such as 6.25 GHz. A lightpath can be allocated a nominal centre wavelength selected from the grid of values. The bandwidth of the channel can occupy a variable number of frequency slots. FIG. 2 shows three lightpaths 23, 24, 25 of different bandwidths. Lightpath 25 has the nominal centre wavelength 26. The number of frequency slots allocated to a lightpath can depend on transmission parameters of the lightpath, such as: bit rate; modulation scheme; Forward Error Correction (FEC) scheme. The transmission parameters may depend on the distance of the lightpath (reach) and quality of transmission possible along the lightpath.

Figure 3:
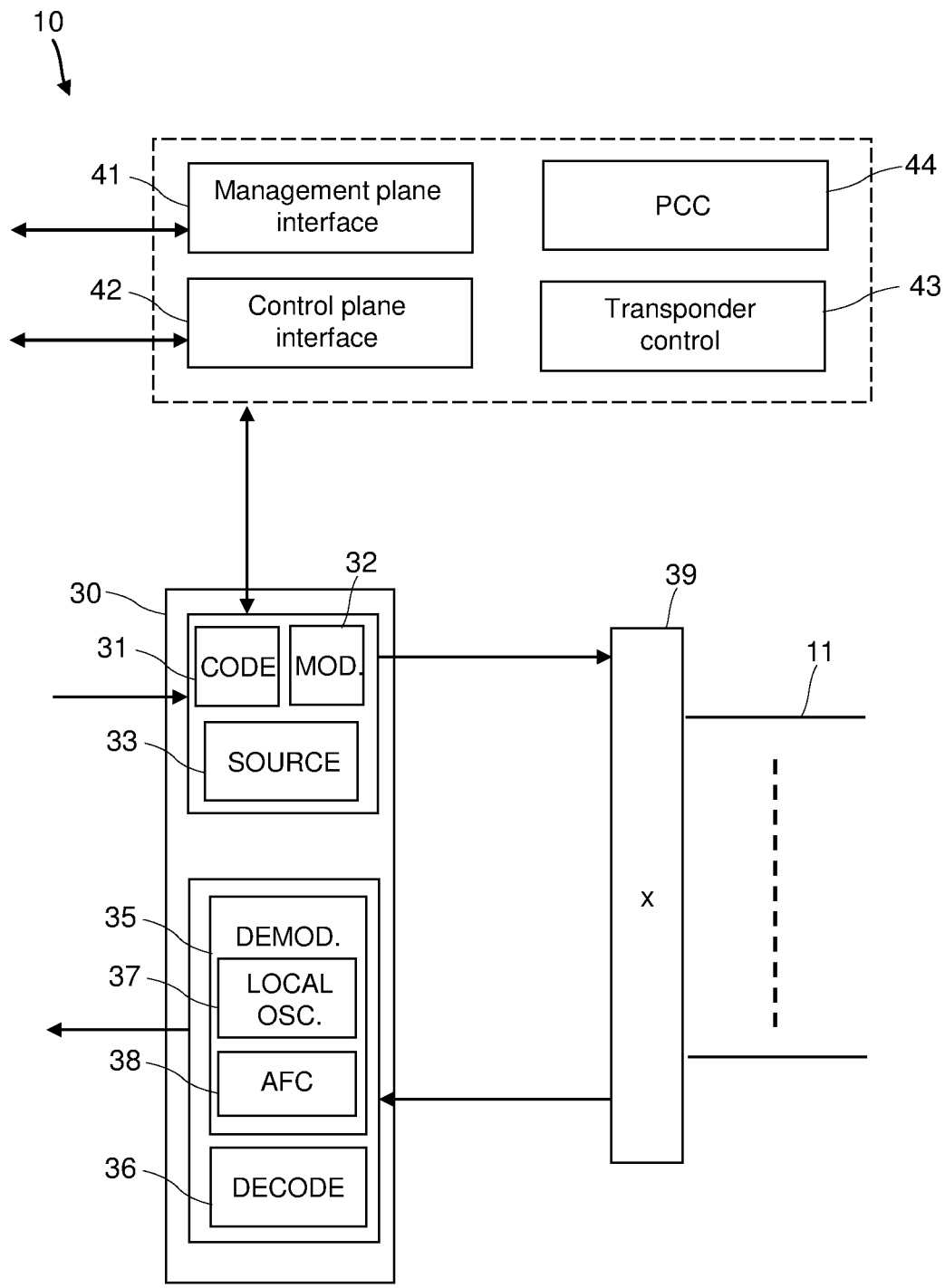
FIG. 3 shows a node for use in the flexible optical network.

FIG. 3 shows an example of a node 10 in the flexible optical network 2. Firstly, the functions related to transmission are considered. The transponder 30 comprises a coder 31 which is arranged to apply Forward Error Correction (FEC) coding 31 to a data signal received from a source. The FEC scheme can be selected from a plurality of possible FEC schemes. The transponder 30 comprises a modulator 32 which is arranged to modulate an optical carrier signal with the coded signal using one of a range of possible modulation formats. An optical source 33, such as a laser, supplies an optical signal to the modulator 32.

Next, the functions related to reception are considered. The transponder 30 comprises a demodulator 35 which is arranged to demodulate a received optical signal using a demodulation technique which is complementary to the scheme used to modulate the signal at a source node. The demodulation scheme can be selected from a range of possible modulation formats. A decoder 36 decodes the demodulated signal using a decoding technique which is complementary to that used to encode the signal at the source node. The demodulator 35 uses a local oscillator (LO) 37 and an Automatic Frequency Control (AFC) function 38. The LO 37 and AFC 38 allow the demodulator to track a signal within a particular window of frequencies.

In each node 10, a variable bandwidth optical cross connect (BV-OXC) 39 multiplexes a set of different wavelength signals in the transmit direction and demultiplexes a set of wavelength signals in the receive direction, according to their spectrum occupation. In an intermediate node along a lightpath, the BV-OXC routes signals between ingress and egress ports according to frequency. A BV-OXC can handle a variable amount of bandwidth per channel, e.g. 25 GHz bandwidth for channel 1, 75 GHz for an adjacent channel 2, etc.

Transponders 30 may support transmission or reception at one or more bitrates, such as 2.5 Gb/s, 10 Gb/s, 40 Gb/s, 100 Gb/s 200 Gb/s, 400 Gb/s, 1 Tb/s. Future systems may use higher bitrates. Transponders may support transmission or reception using one or more modulation formats, such as On-Off Keying (OOK) or a phase modulation format such as Differential Quadrature Phase Shift Keying (DQPSK), Dual Polarisation-Quadrature Phase Shift Keying (DP-QPSK), Quadrature Amplitude Modulation (DP-QAM) and Dual Polarisation-Quadrature Amplitude Modulation (DP-QAM).

Figure 1A:
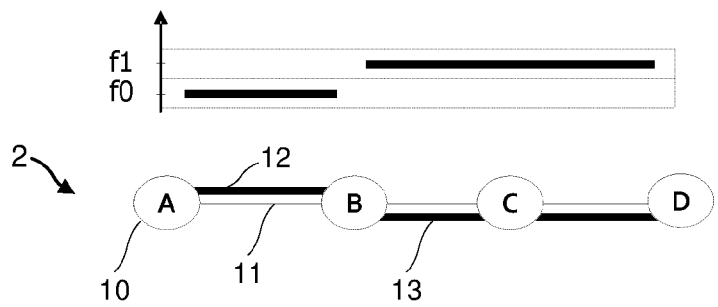
FIGS. 1A and 1B show part of an optical communication network and spectrum allocation to lightpaths.
Figure 1B:
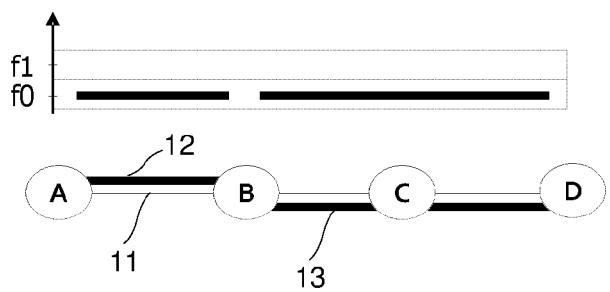
Figure 4:
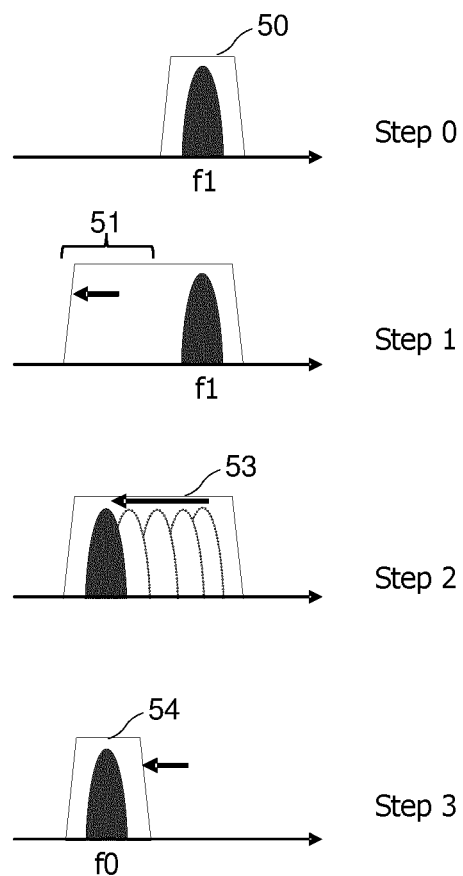
FIG. 4 shows a method according to an embodiment of the invention to change the allocation of resources to a lightpath.

FIG. 4 shows a defragmentation method according to an embodiment of the present invention which is suitable for flexible optical networks. FIG. 4 show an alternative scheme to that of FIG. 1C, which achieves the same final spectral allocation as FIG. 1C. The spectral allocation for the original spectral position of a lightpath, before implementing the method, is shown in FIG. 1A and step 0 of FIG. 4. The spectral allocation after implementing the method is shown in FIG. 1B and step 3 of FIG. 4. Initially, before implementing the method, the lightpath 13 is allocated a block 50 of frequency slots with the nominal centre frequency f1. The block 50 has a lower edge and an upper edge. In the first step of the method, there is a reconfiguration of the spectral resources allocated to the existing lightpath 13. This "reconfiguration" comprises increasing the amount of resources allocated to the existing lightpath. In this example the final spectral position of the lightpath is a lower frequency (i.e. f0<f1). In step 1, the spectral resources allocated to the lightpath are increased 51 on the lower frequency side, with the lower edge of the block moving outwards. The total spectral allocation to the lightpath encompasses the resources allocated to the lightpath in the original spectral position (step 0) and the resources which will be allocated to the lightpath in the new spectral position (step 3). In the example shown in FIG. 4 the new spectral position is directly adjacent to the original spectral position and the total spectral allocation at step 1 is twice the original allocation. For example, if the original spectral allocation is k slots (where k is an integer number≥1) then the total spectral allocation at step 1 is at least 2k slots. The allocation may be "at least" 2k slots due to possible guard band(s) separating the new and original spectral position. However, in the general case the nominal centre wavelengths of the original spectral position and the new spectral position can be any non-identical values (i.e. f1≠f0). If the new spectral position is not directly adjacent to the original spectral position, then the total spectral allocation at step 1 will be more than twice the original allocation. For example, if the original spectral allocation is k slots (where k is an integer number≥1) and the new spectral position is offset from the original position by 2k slots, then the total spectral allocation is at least k+2k+k slots=4k slots. The additional resources are reserved at all nodes along the lightpath.

In step 2 the existing lightpath is moved, in frequency, from the original spectral position (shown in steps 0, 1) to the final spectral position (shown in step 3). The nominal central frequency changes from f1 to f0. Consider that $f_B$ is the actual central frequency of the transmitter laser at source node B and that $f_D$ is the actual central frequency of the local oscillator at the receiver node D. Then, $f_B \approx f_D \approx$ f1 at the start of step 2. Then, frequency $f_B$ is pushed from f1 to f0 by tuning the TX source (e.g. laser) at a certain frequency sweep rate f'. The automatic frequency control (AFC) capabilities of the receiver allow the receiver to follow the lightpath as it is moved in frequency. In the case of a coherent receiver, the receiver will digitally estimate and compensate for the increasing frequency offset:

$$\Delta f = |f_D - f_B|.$$

Consider the maximum offset tolerance of the AFC is $\Delta f_{MAX}$. Advantageously, to prevent $\Delta f$ exceeding $\Delta f_{MAX}$, the digital estimate of $\Delta f$ is used as a feedback error signal to control $f_D$. In this way, $f_D$ is forced to follow $f_B$, slowly pulled from $f_1$ to $f_0$. Therefore, at the end of the second step, $f_B \approx f_D \approx f_0$. A detailed description of AFC in a coherent receiver is provided, for example, in G. Colavolpe, T. Foggi, E. Forestieri, and G. Prati, "Robust multilevel coherent optical systems with linear processing at the receiver", Lightwave Technology, Journal of, vol. 27, no. 13, pp. 2357-2369, July, 2009.

In step 3 there is a further reconfiguration of the spectral resources allocated to the lightpath. This reconfiguration comprises releasing at least some of the spectral resources that were allocated for the original spectral position of the lightpath at step 0. Step 3 releases the spectral resources that are no longer required for the new spectral position of the lightpath. Step 3 may release all of the spectral resources that were allocated for the original spectral position of the lightpath at step 0. In the example of FIG. 1A, 1B, the k frequency slots about the nominal centre frequency f1 that were originally allocated to the lightpath are released, leaving the k slots having a nominal centre frequency f0 included within the resources allocated to the lightpath.

An advantage of the method is that all of the steps shown in FIG. 4 can be performed while the lightpath continues to carry traffic, without disruption to the traffic. The lightpath is carrying traffic at step 0, before the method begins, and continues to carry traffic during steps 1-3. A lightpath which is being used to carry traffic can be called an active lightpath or an in-service lightpath. The source node of a lightpath is arranged to continue to send traffic over the lightpath during the change in the spectral position of the lightpath and the destination node of a lightpath is arranged to continue to receive traffic over the lightpath during the change in the spectral position of the lightpath.

FIG. 4 shows an example where the new spectral position of the lightpath is lower in frequency than the original spectral position. The method can also be applied to situations where the new spectral position of the lightpath is higher in frequency than the original spectral position. At step 1, additional resources are allocated in a higher frequency part of the spectrum and at step 2 the existing lightpath is moved to a new spectral position which is higher in frequency than the original spectral position.

Figure 5A:
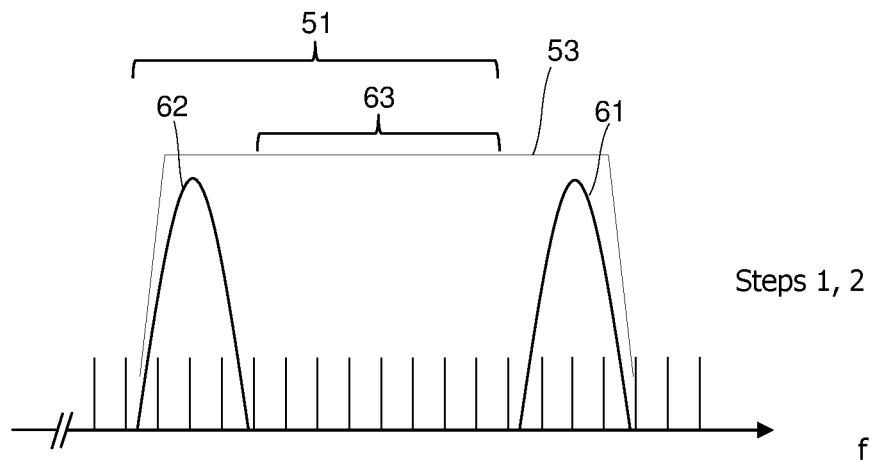
FIG. 5A shows reservation of intermediate resources.

As described above, the original spectral position of the lightpath and the new spectral position of the lightpath do not have to be adjacent in frequency, but can be offset by other, intermediate spectral resources. FIG. 5A shows an example of the total resources allocated at step 2 of the method in this situation, with the original spectral position 61, new spectral position 62 and intermediate spectral resources 63. In this situation, the intermediate spectral resources 63 should be unallocated to other lightpaths, to avoid interference during the method.

Figure 5B:
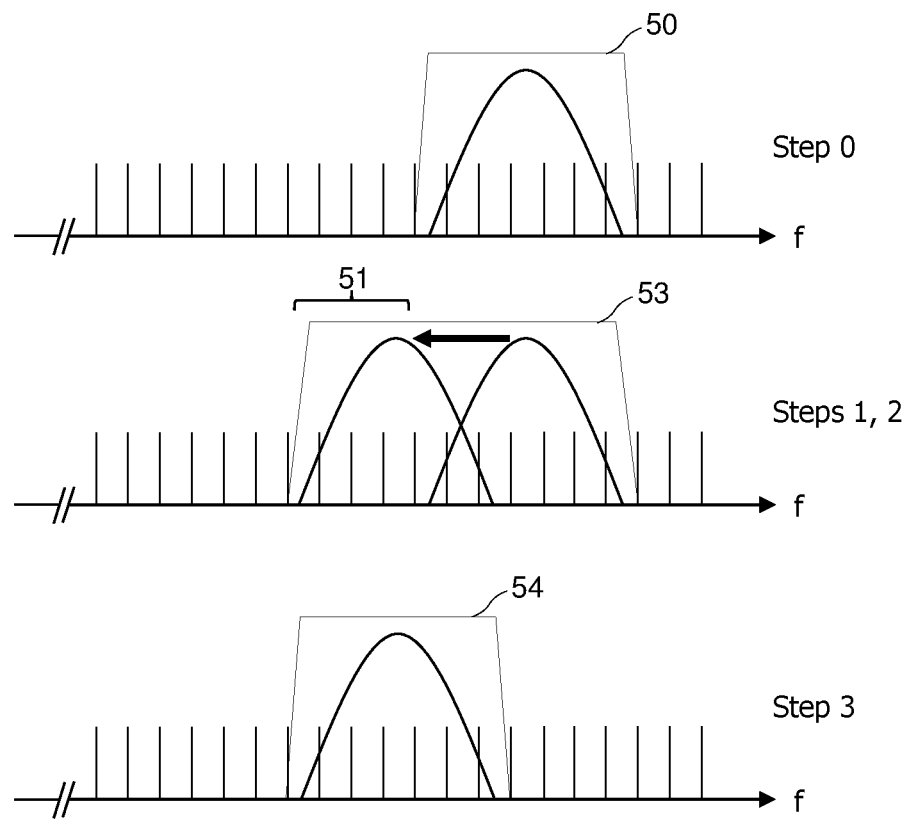
FIG. 5B shows a method according to an embodiment of the invention where there is an overlap in the spectral resources allocated to the original spectral position of the lightpath and the new spectral position of the lightpath.

FIG. 5B shows an example of a situation where there is an overlap in the spectral resources 50 allocated to the original spectral position of the lightpath and the resources 54 allocated to the new spectral position of the lightpath. This situation can occur when there is a relatively small frequency shift between the original spectral position and the new spectral position. The additional resources 51 allocated at step 1 can be relatively small, and will be less than the amount of resources already allocated to the original position of the lightpath. At step 3, some of the resources 50 allocated to the original spectral position of the lightpath are released and some of the resources 50 allocated to the original spectral position of the lightpath are re-used in the new spectral position. The spectral resources 54 comprise all of the additional spectral resources 51 that were added at step 1 along with some of the spectral resources 50 that were allocated to the original spectral position of the lightpath.

In the examples described so far, the amount of spectral resources allocated to the lightpath remain the same before and after the shift in spectral position, i.e. bandwidth remains the same. This is expected to be the normal situation.

Figure 5C:
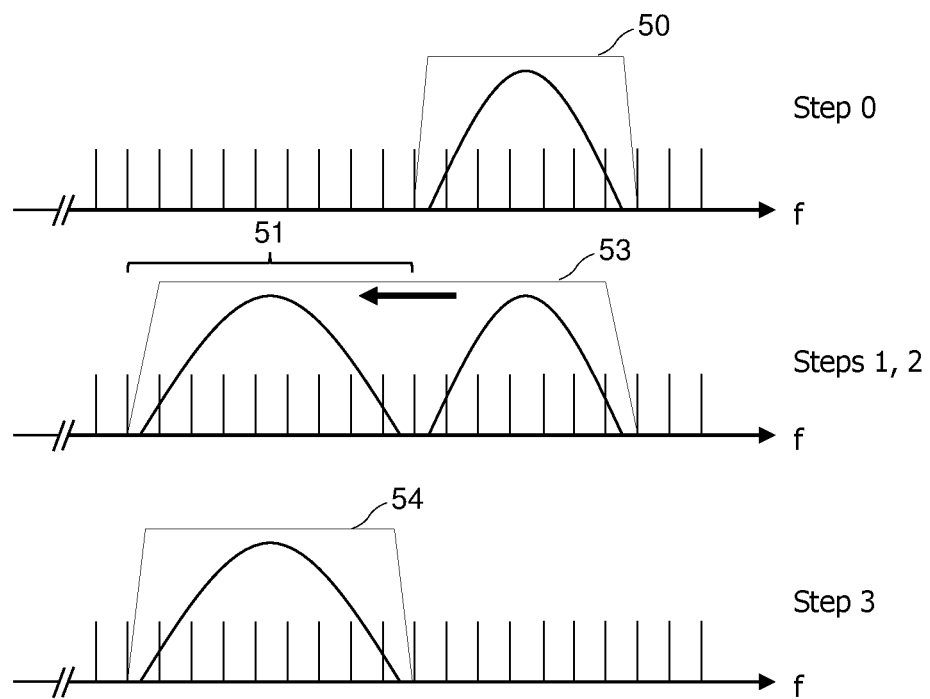
FIG. 5C shows a method according to an embodiment of the invention where there is an increase in the spectral resources allocated in the new spectral position of the lightpath compared to the original spectral position of the lightpath.
Figure 5D:
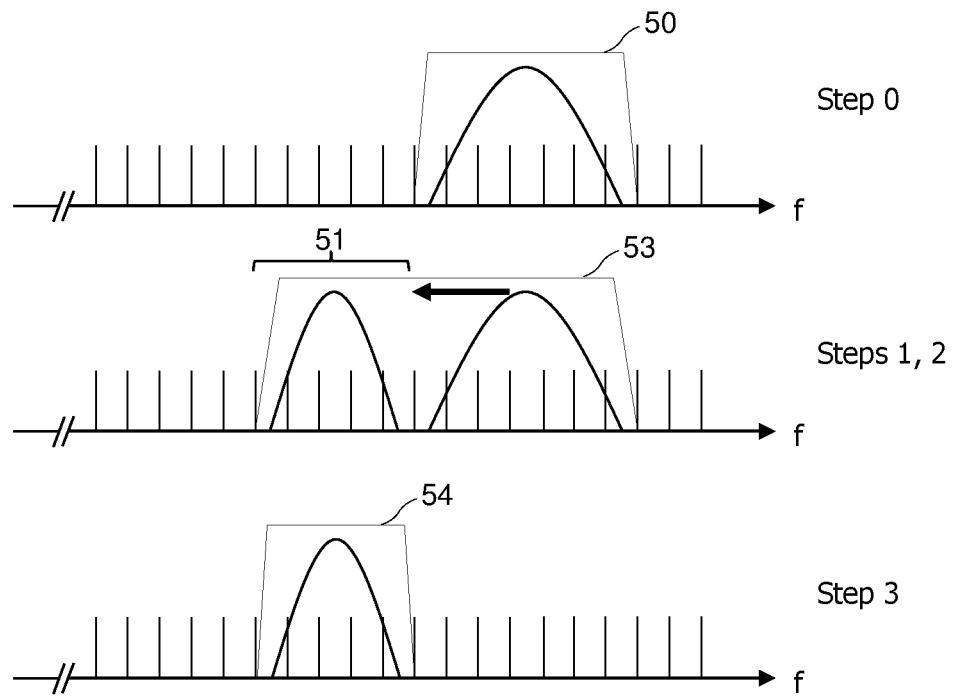
FIG. 5D shows a method according to an embodiment of the invention where there is a decrease in the spectral resources allocated in the new spectral position of the lightpath compared to the original spectral position of the lightpath.

In other embodiments it is possible to combine the move in spectral position with a change in the amount of spectral resources allocated to the lightpath. FIG. 5C shows a method according to an embodiment of the invention where there is an increase in the spectral resources 54 allocated in the new spectral position of the lightpath compared to the spectral resources 50 allocated to the original spectral position of the lightpath. FIG. 5D shows a method according to an embodiment of the invention where there is a decrease in the spectral resources 54 allocated in the new spectral position of the lightpath compared to the spectral resources 50 allocated to the original spectral position of the lightpath. There can be an overlap in the spectral resources 50 allocated to the original spectral position of the lightpath and the resources 54 allocated to the new spectral position of the lightpath in FIGS. 5C and 5D, in a similar manner to what has been shown in FIG. 5B.

The method can be used in flexible optical networks with non-coherent receivers (e.g. OOK modulation format with direct detection). In this case, at step 2, the TX can be pushed from $f_1$ to $f_0$ without requiring any automatic frequency control (AFC) capabilities at the receiver because the whole received optical power is photodetected, provided that all filters along the transmission path from the source node to the destination node are configured according to step 1.

Figure 1C:
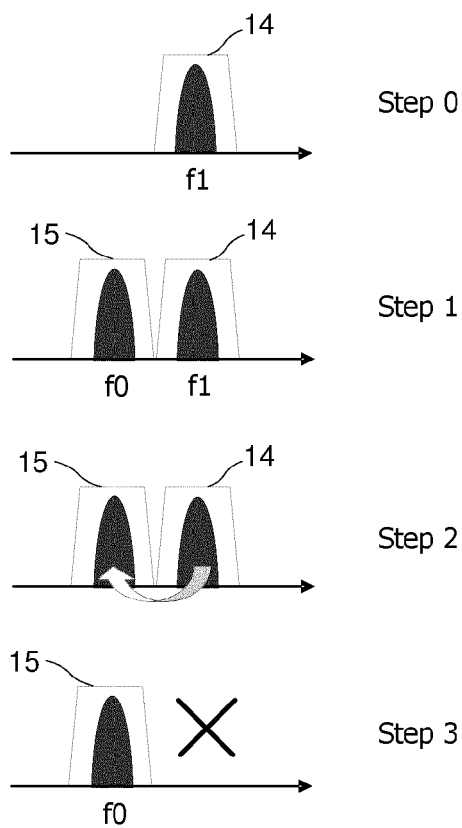
FIG. 1C shows a defragmentation process called make-before-break to change the allocation of resources to one of the lightpaths of FIG. 1A to arrive at the allocation shown in FIG. 1B.
Figure 6:
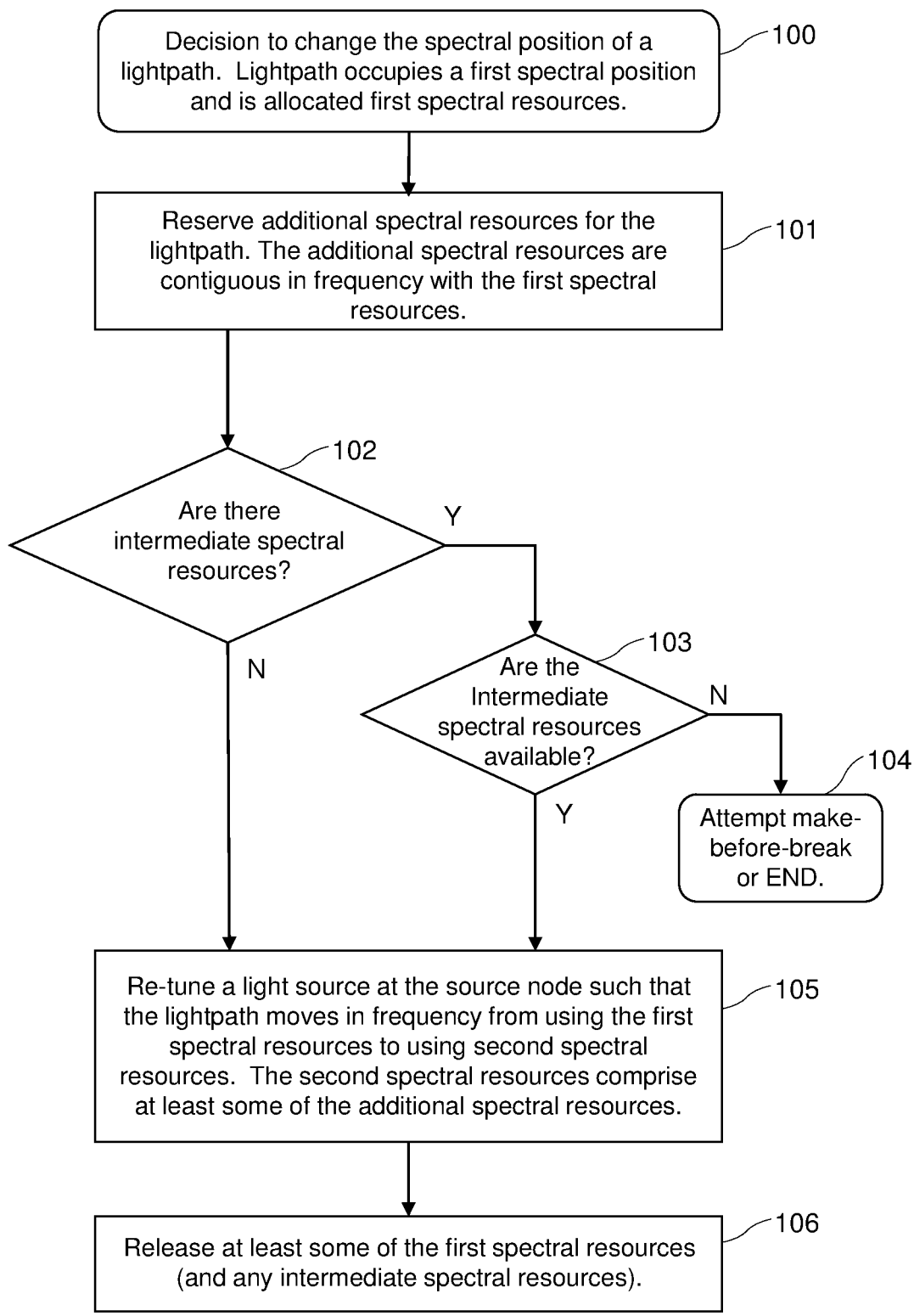
FIG. 6 shows a method of changing spectral allocation of a lightpath which can be performed at a source node.

FIG. 6 shows a method of changing the spectral position of a lightpath, performed by a source (transmitting) node of the lightpath. The steps shown in FIG. 6 occurs while the lightpath is being used to carry traffic. At step 100 a decision is made to change the spectral position of a lightpath. The lightpath occupies a first spectral position and is allocated first spectral resources. Step 101 comprises reserving additional spectral resources for the lightpath. The additional spectral resources are contiguous in frequency with the first spectral resources. Step 102 determines if there are any intermediate spectral resources between the first spectral resources used in the original spectral position and the second spectral resources used in the new spectral position. If there are no intermediate spectral resources, the method proceeds to step 105 and re-tunes a light source at the source node such that the lightpath moves in frequency from using the first spectral resources to using the second spectral resources. Step 106 releases at least some of the first spectral resources. Returning to step 102, if there are intermediate spectral resources (e.g. resources 63 shown in FIG. 5A), the method proceeds to step 103 and determines if the intermediate spectral resources are available. If so, the method proceeds to step 105 as before. At step 106 the intermediate spectral resources are also released. If step 103 determines that the intermediate spectral resources are not available, the method proceeds to step 104. The method can either attempt a make-before-break technique to change the spectral position of the lightpath (as shown in FIG. 1C and described above, with the new lightpath being located in a separate block of spectrum from the existing lightpath), or the method can end with no further action.

Figure 7:
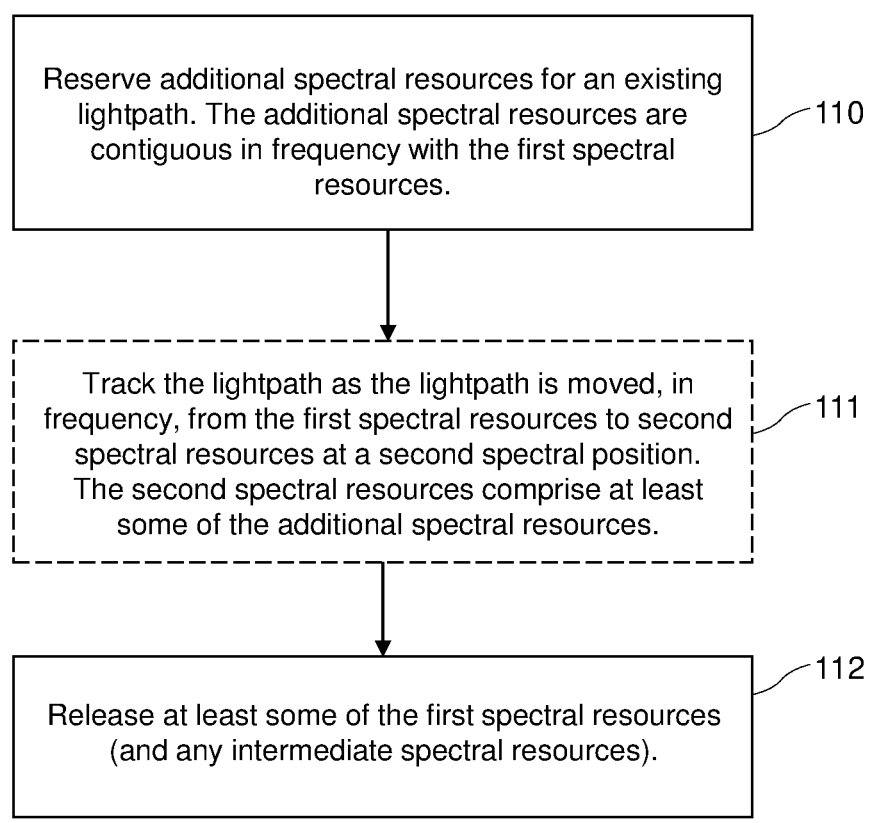
FIG. 7 shows a method of changing spectral allocation of a lightpath which can be performed at a destination node.

FIG. 7 shows a method of changing the spectral position of a lightpath, performed by a destination (receiving) node of the lightpath. The steps shown in FIG. 7 occurs while the lightpath is being used to carry traffic. Step 110 comprises reserving additional spectral resources for an existing lightpath. The additional spectral resources are contiguous in frequency with the first spectral resources. Optionally, step 111 comprises tracking the lightpath as the lightpath is moved, in frequency, from the first spectral resources to the second spectral resources. As explained above, some receiver types (e.g. a non-coherent receiver) may not require this step. Step 112 comprises releasing at least some of the first spectral resources (and any intermediate spectral resources).

The method described above can be performed using control plane signalling or by management plane signalling. With a control plane implementation of the method, one node initiates the process to change the spectral position of the lightpath and signals to other nodes along the lightpath using control plane signalling, such as Resource Reservation Protocol-Traffic Engineering (RSVP-TE) signalling, forming part of a Generalised Multi-Protocol Label Switching (GMPLS) control plane. With a management plane implementation, a Network Management System (NMS) or a similar entity can initiate the method, signal to each node involved in the lightpath, and configure parameters at nodes such as: reservation of spectral resources; releasing spectral resources; controlling source re-tuning.

Figure 8:
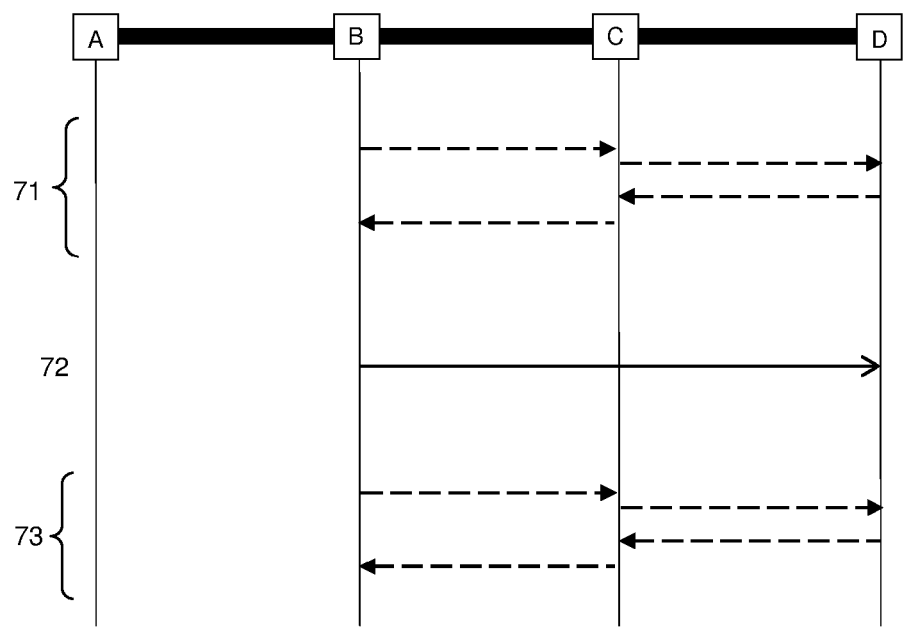
FIG. 8 shows control plane signalling to perform the method of changing spectral allocation of a lightpath.

The method can be implemented without any new control plane extensions specifically for the method. FIG. 8 shows control plane signalling between nodes B-D for the scenario shown in FIGS. 1A and 1B, where there is a need to move the spectral position of a lightpath between nodes B-D. Reservation of spectral resources can be achieved by existing control plane operations (e.g. signalling) involving all nodes along the considered route are required to reserve spectral resources (step 1, 71) and release spectral resources (step 3, 73). Frequency re-tuning (step 2) can be implemented without any additional or specific source-destination communication.

Advantages may be obtained by providing additional control plane or management plane signalling information, such as functionalities to enable more effective operations (e.g. global defragmentation procedures). Some examples of additional signalling information includes explicitly informing a node about the change in spectral position of the lightpath, such as information about the change in the nominal centre wavelength that will occur. This information can prepare a node to expect a change in wavelength. This information may be used in various ways by a destination node, such as to configure the AFC for the expected change in wavelength, or to avoid raising an alarm when a significant change in nominal centre wavelength is detected at the destination node.

Advantageously, the destination node can be arranged to suppress any alarm(s) that may normally occur as the lightpath moves in frequency from using the first spectral resources at the first spectral position to using second spectral resources at a second spectral position.

Figure 9:
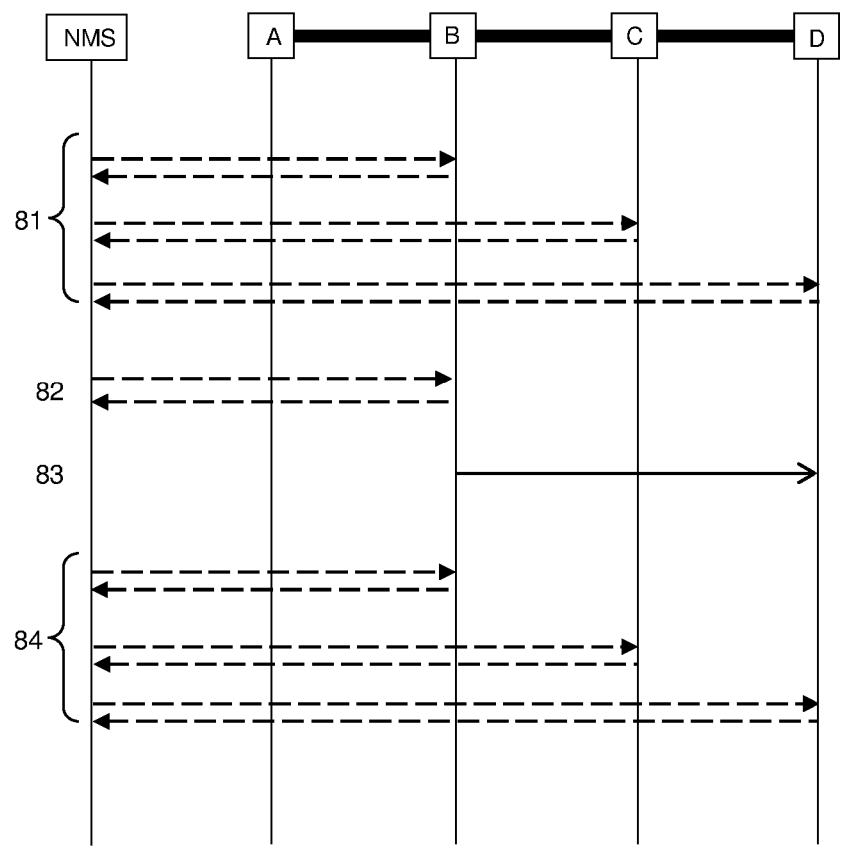
FIG. 9 shows management plane signalling to perform the method of changing spectral allocation of a lightpath.

FIG. 9 shows a management plane implementation of the method for the scenario shown in FIGS. 1A and 1B, where there is a need to move the spectral position of a lightpath between nodes B-D. A network management system (NMS) signals to each node B-D involved in the change of spectral position of the lightpath. The NMS signals 81 to each of nodes B-D to reserve spectral resources for the new spectral position of the lightpath. The re-tuning can be initiated by signalling 82 between the NMS and the source node B. Node B re-tunes at 83. The NMS signals 84 to each of nodes B-D to release spectral resources once the lightpath has moved to the new spectral position.

Figure 10:
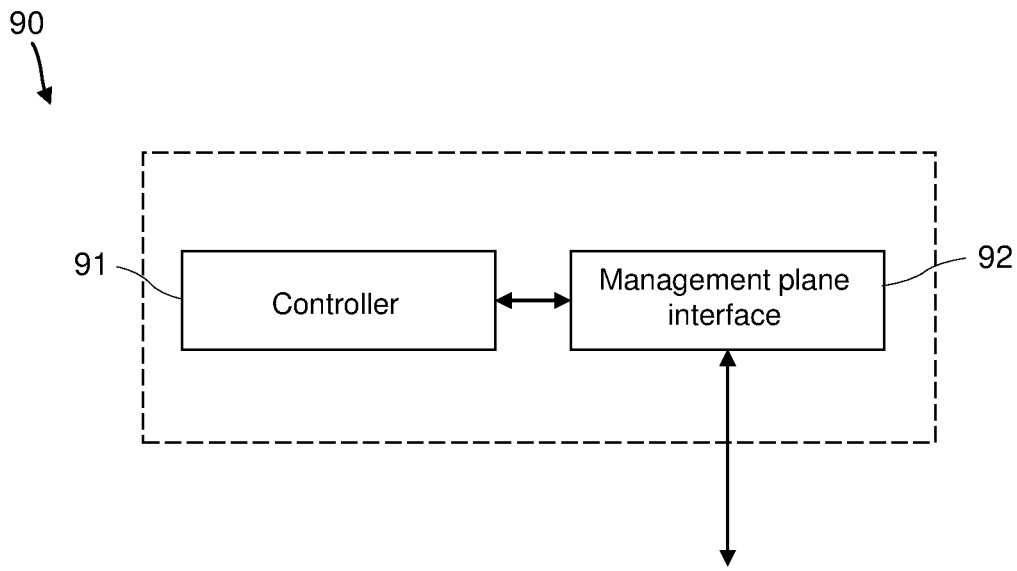
FIG. 10 shows a node of the network management system.

FIG. 10 shows apparatus associated with the management plane implementation. A node 90 of the network management system comprises a controller 91 and an interface 92 for communicating with nodes 10 of the network 2. Controller 91 is arranged to send signalling to nodes 10 via the interface 92. As shown in FIG. 9, controller 91 can send signalling via interface 92 to: reserve resources at nodes along the lightpath; begin re-tuning at the source node; and release resources at nodes along the lightpath when the lightpath has been moved to the new spectral position. Although not necessary, the NMS 90 may inform the destination node that the lightpath is going to be moved/re-tuned.

A routing protocol may be used to disseminate resource availability information. In this case, any node is aware of all of the available/occupied resources in the network (e.g. Open Shortest Path First-Traffic Engineering (OPSF-TE) Area). Thus, a node can evaluate the status of the network and decide to perform re-optimisation for the lightpaths for which that node behaves as ingress node. More generally re-optimisation of resources is driven by a centralised element such as the NMS.

The method is suitable for different bit-rates and modulation formats in flexible optical networks with path computation either centralised (PCE) or distributed (performed by the source node).

Although defragmentation operations do not typically have stringent time requirements (e.g. they could be performed over a period of several minutes), the method described here is expected to operate in a manner which is both safe (i.e. without traffic loss) and fast (e.g. within a time period of less than 1 second). Note that the application field of the proposed invention is not limited to flexigrid stand alone OXCs (e.g. ROADMs operating on a flexigrid in a WSON scenario) but it is also possible in the optical component integrated in a POTP device. In such multi technology equipments, the proposed idea adds to the optimization at the packet layer a further level of bandwidth optimization at the optical layer.

AFC Implementation Considerations

Depending on the adopted AFC strategy (e.g., data-aided or non-data aided, open-loop or closed-loop), different offset tolerance $\Delta f_{MAX}$ and tracking speed can be achieved. Typically, for a symbol rate of $R_s$, the maximum tolerated offset is at least $\Delta f_{MAX}=0.1\ R_s$ (even limited by the optoelectronic front-end bandwidth) and a residual (after AFC) offset $\Delta f < 10^{-3}\ R_s$ should be obtained to avoid performance degradation.

Therefore, the AFC can be easily designed (by setting its equivalent bandwidth) to track f without performance degradation. Moreover, the local oscillator frequency $f_D$ only needs a rough (more accurate than $\Delta f_{MAX}$) and slow (at same rate as $f_B$ and with a loop delay shorter than $\Delta f_{MAX}=f'$) control.

As a realistic example, for a DP-QPSK at 100 Gb/s and a laser sweep rate f'=5 THz/s, considering $f_D$ controlled with an accuracy smaller than 2.5 GHz and a loop delay shorter than 0.5 ms, the re-tuning operation is completed in less than 1 s.

Performance Evaluation

The method performs defragmentation (without traffic disruption) by moving lightpaths only to contiguous and free spectrum frequencies along the same route of the original path. In the following, the global defragmentation performance of the Push-Pull technique is evaluated by accounting also for this specific constraint. The performance evaluation is conducted through simulations over a flexible optical network having the Telecom Italia Sparkle topology, with N=21 nodes and L=25 links. A set of unidirectional lightpath requests is considered. Each lightpath operates at 100 Gb/s and occupies k=4 slots of width 12.5 GHz. In particular, a uniform traffic matrix of one lightpath request per node pair among six relevant cities is considered (total of 30 unidirectional requests). A link capacity of F=10 contiguous nominal central frequencies (i.e. 40 slots) is utilized to accommodate the considered traffic matrix. In each simulation, to reproduce a fragmented optical network (e.g., due to dynamic or unexpected network evolutions), the set $P_0$ of active lightpaths at time t=0 (i.e. before defragmentation) is defined by randomly allocating each request along its shortest path over one of the F available frequencies. When multiple equal cost shortest paths exist, random choice is performed. Then, $\Lambda_t$ is used to indicate the actual number of occupied nominal central frequencies at time t in the whole network ($\Lambda_t \leq F, \forall t$). $\Lambda_0$ then represents the (given) actual initial value ($\Lambda_0 = F$).

Each simulation comprises the defragmentation of the considered network scenario by applying the Push-Pull technique. For simplicity, although significant parallelism could be achieved, in the simulations just one re-tuning to just one contiguous central frequency per time period is here considered. Up to T=10 time periods are considered.

Figure 11:
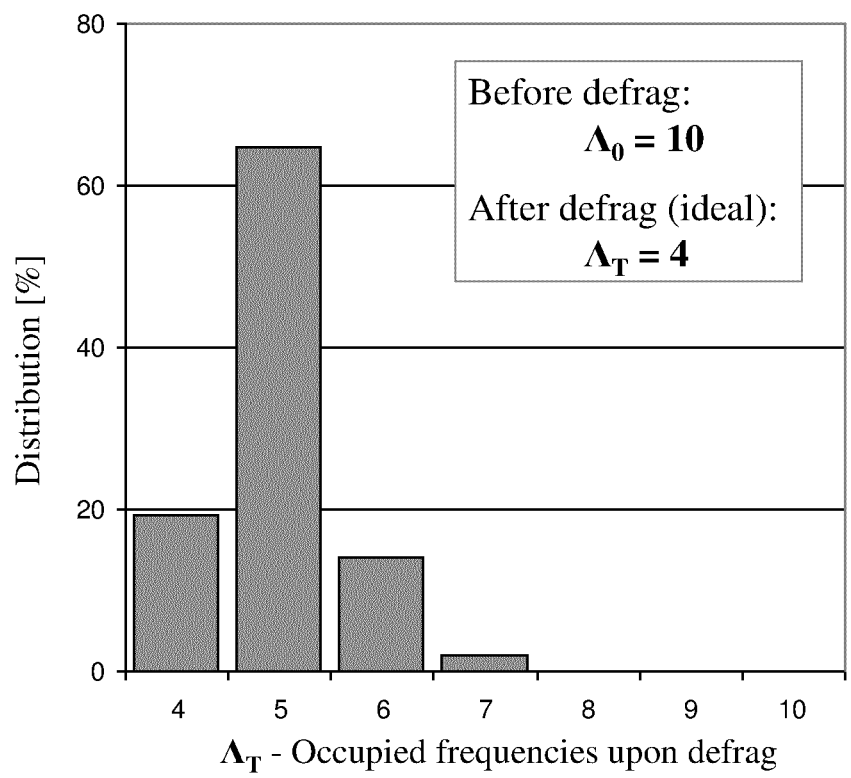
FIG. 11 shows results of defragmentation performance.

Among the possible objective functions enabling defragmentation, here we apply the minimization of the final amount of occupied nominal central frequencies, i.e. $\Lambda_T$. 100 simulations have been performed. The defragmentation performance of the proposed technique is compared with the ideal performance achieved without the Push-Pull constraint. In the ideal case, a reduction of 60% from the initial value of occupied central frequencies is always achieved ($\Lambda_T$=4). As shown in FIG. 11, the Push-Pull technique achieves, in the 64% of the cases, a reduction of occupied frequencies from $\Lambda_0$=10 to $\Lambda_T$=5 (i.e., 50%), and in 19% of the cases a reduction of 60% of the frequencies, i.e. efficiently obtaining the same ideal value of $\Lambda_T$=4.

Figure 12:
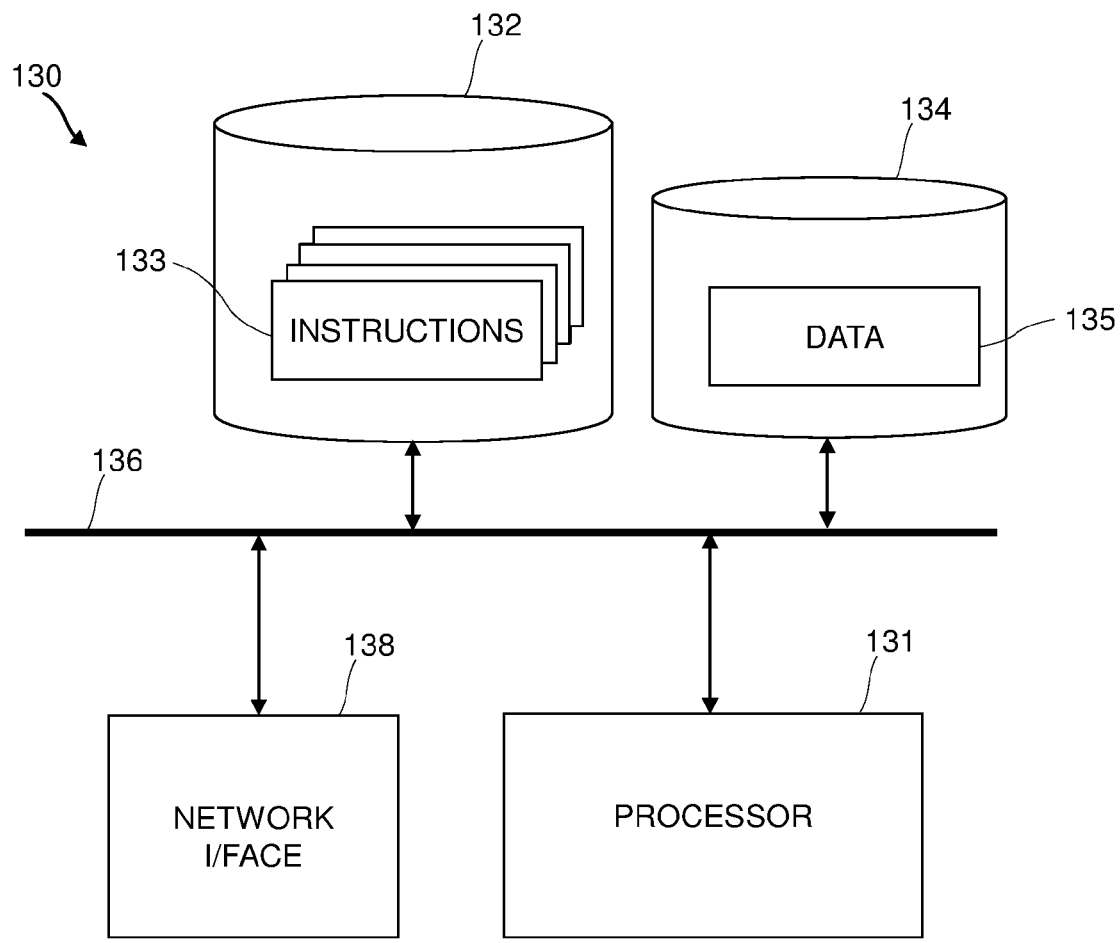
FIG. 12 shows processing apparatus for a computer-based implementation of the method.

FIG. 12 shows an exemplary processing apparatus 130 which may be implemented as any form of a computing and/or electronic device, and in which embodiments of the system and methods described above may be implemented. Processing apparatus 130 can be provided at one of the nodes 10, or at a node 90 forming part of the network management system. Processing apparatus may implement the method shown in FIG. 6 or 7. Processing apparatus 130 comprises one or more processors 131 which may be microprocessors, controllers or any other suitable type of processors for executing instructions to control the operation of the device. The processor 131 is connected to other components of the device via one or more buses 136.

Processor-executable instructions 133 may be provided using any computer-readable media, such as memory 132. The processor-executable instructions 133 can comprise instructions for implementing the functionality of the described methods. The memory 132 is of any suitable type such as read-only memory (ROM), random access memory (RAM), a storage device of any type such as a magnetic or optical storage device. Additional memory 134 can be provided to store data 135 used by the processor 131. The processing apparatus 130 comprises one or more network interfaces 138 for interfacing with other network entities, such as other nodes 10 of the network 2.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of changing the spectral position of a lightpath between a source node and a destination node of an optical network, wherein the optical network uses a flexible grid for spectral allocation and the lightpath has been allocated first spectral resources at a first spectral position, the method comprising at the source node:
reserving additional spectral resources for the lightpath which are contiguous in frequency with the first spectral resources;
re-tuning a light source at the source node such that the lightpath moves in frequency from using the first spectral resources at the first spectral position to using second spectral resources at a second spectral position, wherein the second spectral resources comprise at least some of the additional spectral resources; and
releasing at least some of the first spectral resources, wherein the source node continues to send traffic over the lightpath during the re-tuning.

2. The method according to claim 1 wherein the second spectral resources are at least one of contiguous in frequency with the first spectral resources and overlapping in frequency with the first spectral resources.

3. The method according to claim 1 wherein the second spectral resources are offset from the first spectral resources by intermediate spectral resources, the step of reserving additional spectral resources reserves the intermediate spectral resources and the step of releasing also releases the intermediate spectral resources.

4. The method according to claim 3 further comprising determining if the intermediate spectral resources are available.

5. The method according to claim 1 wherein there is a receiver at the destination node for receiving the lightpath and the step of re-tuning a source is performed at a rate which is within automatic frequency tuning capabilities of the receiver.

6. The method according to claim 1 wherein an amount of spectral resources allocated to the lightpath remains the same in the first spectral position and the second spectral position.

7. The method according to any one of the preceding claim 1 further comprising notifying the destination node of the change in the spectral position of the lightpath before the re-tuning.

8. The method of claim 1, comprising at a network management system, causing the source node to perform the method.

9. A method of changing the spectral position of a lightpath between a source node and a destination node of an optical network, wherein the optical network uses a flexible grid for spectral allocation and wherein the lightpath has been allocated first spectral resources at a first spectral position, the method comprising at the destination node:
reserving additional spectral resources for the lightpath which are contiguous in frequency with the first spectral resources; and
releasing at least some of the first spectral resources after the lightpath has moved in frequency from using the first spectral resources at the first spectral position to using second spectral resources at a second spectral position, wherein the second spectral resources comprise at least some of the additional spectral resources;
wherein the destination node continues to receive traffic over the lightpath during the change in the spectral position of the lightpath.

10. The method according to claim 9 further comprising tracking the lightpath as the lightpath is moved, in frequency, from the first spectral resources to the second spectral resources.

11. The method according to claim 9 further comprising receiving a notification of the change in the spectral position of the lightpath.

12. The method according to claim 9 wherein the method further comprises suppressing any alarms that occur as the lightpath moves in frequency from using the first spectral resources at the first spectral position to using second spectral resources at a second spectral position.

13. An apparatus for use at a node of an optical network which uses a flexible grid for spectral allocation, the apparatus comprising:
a transponder which is arranged to support a lightpath which is allocated first spectral resources at a first spectral position, the transponder comprising a light source; and
a controller which is arranged to support a change in a spectral position of the lightpath by:
reserving additional spectral resources for the lightpath which are contiguous in frequency with the first spectral resources;
re-tuning the light source at the node such that the lightpath moves in frequency from using the first spectral resources at the first spectral position to using second spectral resources at a second spectral position, wherein the second spectral resources comprise at least some of the additional spectral resources; and
releasing at least some of the first spectral resources, wherein the node is arranged to continue to send traffic over the lightpath during the change in the spectral position of the lightpath.

14. An optical network comprising:
the apparatus for use at the node according to claim 13; or
a network management system for the optical network comprising a plurality of nodes which use a flexible grid for spectral allocation, the network management system comprising:
a controller; and
a signalling interface for communicating with nodes of the network,
wherein the controller is arranged to send instructions to the nodes to perform a method of changing the spectral position of a lightpath between a source node and a destination node of the optical network, wherein the lightpath has been allocated first spectral resources at a first spectral position, the method comprising at the source node:

reserving additional spectral resources for the lightpath which are contiguous in frequency with the first spectral resources;

re-tuning a light source at the source node such that the lightpath moves in frequency from using the first spectral resources at the first spectral position to using second spectral resources at a second spectral position, wherein the second spectral resources comprise at least some of the additional spectral resources; and releasing at least some of the first spectral resources, wherein the source node continues to send traffic over the lightpath during the re-tuning.

15. An apparatus for use at a node of an optical network which uses a flexible grid for spectral allocation, the apparatus comprising:

a transponder which is arranged to support a lightpath which is allocated first spectral resources at a first spectral position; and a controller which is arranged to support a change in a spectral position of the lightpath by:

reserving additional spectral resources for the lightpath which are contiguous in frequency with the first spectral resources; and releasing at least some of the first spectral resources after the lightpath has moved in frequency from using the first spectral resources at the first spectral position to using second spectral resources at a second spectral position, wherein the second spectral resources comprise at least some of the additional spectral resources, wherein the node is arranged to continue to receive traffic over the lightpath during the change in the spectral position of the lightpath.

16. The apparatus according to claim 15 wherein the controller is further arranged to track the lightpath as the lightpath is moved, in frequency, from the first spectral resources to the second spectral resources.

17. A network management system for an optical network comprising a plurality of nodes which use a flexible grid for spectral allocation, the network management system comprising:

a controller; and a signalling interface for communicating with nodes of the network, wherein the controller is arranged to send instructions to the nodes to perform a method of changing the spectral position of a lightpath between a source node and a destination node of the optical network, wherein the lightpath has been allocated first spectral resources at a first spectral position, the method comprising at the source node:

reserving additional spectral resources for the lightpath which are contiguous in frequency with the first spectral resources;

re-tuning a light source at the source node such that the lightpath moves in frequency from using the first spectral resources at the first spectral position to using second spectral resources at a second spectral position, wherein the second spectral resources comprise at least some of the additional spectral resources; and releasing at least some of the first spectral resources, wherein the source node continues to send traffic over the lightpath during the re-tuning.

18. A non-transitory machine-readable medium carrying instructions which, when executed by a processor, cause the processor to perform a method of changing the spectral position of a lightpath between a source node and a destination node of an optical network, wherein the optical network uses a flexible grid for spectral allocation and the lightpath has been allocated first spectral resources at a first spectral position, the method comprising at the source node:

reserving additional spectral resources for the lightpath which are contiguous in frequency with the first spectral resources;

re-tuning a light source at the source node such that the lightpath moves in frequency from using the first spectral resources at the first spectral position to using second spectral resources at a second spectral position, wherein the second spectral resources comprise at least some of the additional spectral resources; and releasing at least some of the first spectral resources, wherein the source node continues to send traffic over the lightpath during the re-tuning.

19. The method of claim 9, comprising at a network management system, causing the destination node to perform the method.

* * * * *